United States Patent [19]

van Raamsdonk

[11] 4,223,322

[45] Sep. 16, 1980

[54] MAINTAINING THE NOZZLE SURFACE OF AN INK WRITING HEAD

[75] Inventor: Cornelis van Raamsdonk, Schortens, Fed. Rep. of Germany

[73] Assignee: Olympia Werke AG, Wilhelmshaven, Fed. Rep. of Germany

[21] Appl. No.: 967,870

[22] Filed: Dec. 7, 1978

[30] Foreign Application Priority Data

Dec. 8, 1977 [DE] Fed. Rep. of Germany ....... 2754630
Dec. 17, 1977 [DE] Fed. Rep. of Germany ....... 2756334

[51] Int. Cl.[2] .......................... G01D 15/18; B41J 3/04
[52] U.S. Cl. .................................. 346/140 R; 346/1.1
[58] Field of Search .............. 346/140 R, 75; 400/126

[56] References Cited

U.S. PATENT DOCUMENTS

| | | | |
|---|---|---|---|
| 3,039,438 | 6/1962 | Brown | 346/140 R |
| 3,747,120 | 7/1973 | Stemme | 346/140 R X |
| 3,945,020 | 3/1976 | Kraus | 346/140 R X |
| 3,946,398 | 3/1976 | Kyser | 346/140 R X |
| 4,144,537 | 3/1979 | Yoshiaki | 346/140 R |

FOREIGN PATENT DOCUMENTS

| | | | |
|---|---|---|---|
| 2317911 | 10/1974 | Fed. Rep. of Germany . | |
| 2362576 | 2/1975 | Fed. Rep. of Germany . | |
| 2519160 | 9/1976 | Fed. Rep. of Germany | 346/140 R |
| 2543451 | 3/1977 | Fed. Rep. of Germany . | |
| 2725727 | 12/1977 | Fed. Rep. of Germany . | |
| 2705328 | 8/1978 | Fed. Rep. of Germany . | |

*Primary Examiner*—Joseph W. Hartary
*Attorney, Agent, or Firm*—Spencer & Kaye

[57] ABSTRACT

The nozzle surface of an ink writing head installed in an ink printer is cleaned by bringing a liquid-absorbing cleaning medium into contact with at least those portions of the nozzle surface which surround the nozzle outlet openings, maintaining such contact for a period to permit ink to flow from the nozzles in the direction toward the cleaning medium and to be absorbed by the cleaning medium, whereby such nozzle surface portions are wetted by a liquid phase in which particles to be removed are dissolved, and removing the cleaning medium from the nozzle surface in order to carry such particles away from the nozzle surface. Preferably, the absorbing medium exhibits capillarity and possesses capillary passages smaller in diameter than the nozzles and presents a contact angle of less than 90° with the ink. The cleaning medium can be in the form of a tape held in a cleaning device between two reels and associated with a sealing medium presenting a sealing surface in such a manner to permit one of the cleaning tape surfaces to be brought into contact with the nozzle surface and to permit the other surface of the tape to be brought into contact with the sealing surface after removal of the sealing surface from the nozzle surface.

13 Claims, 9 Drawing Figures

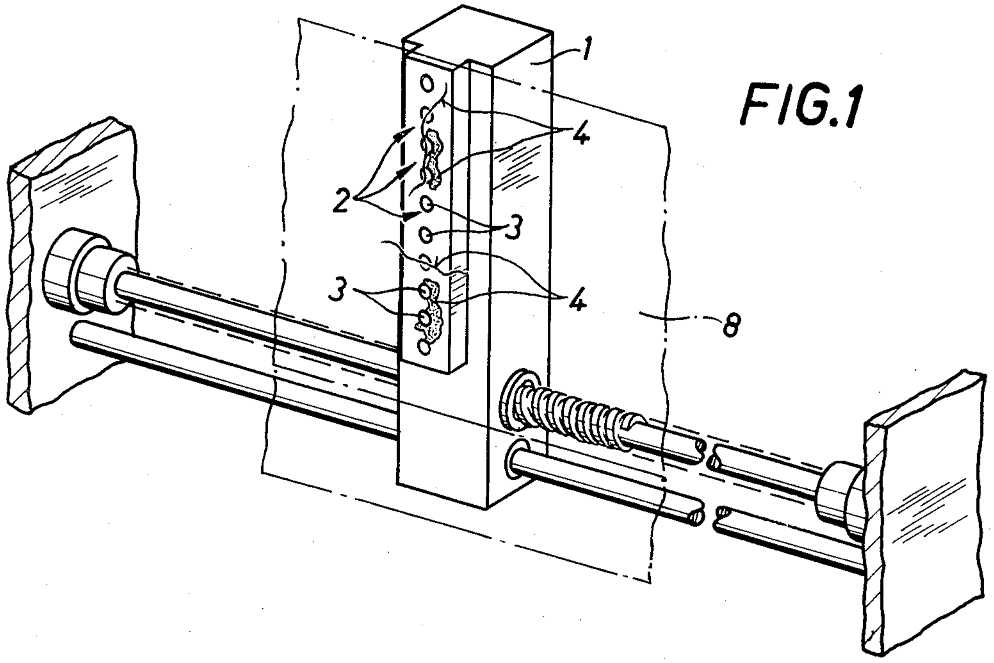
FIG.1
FIG.2
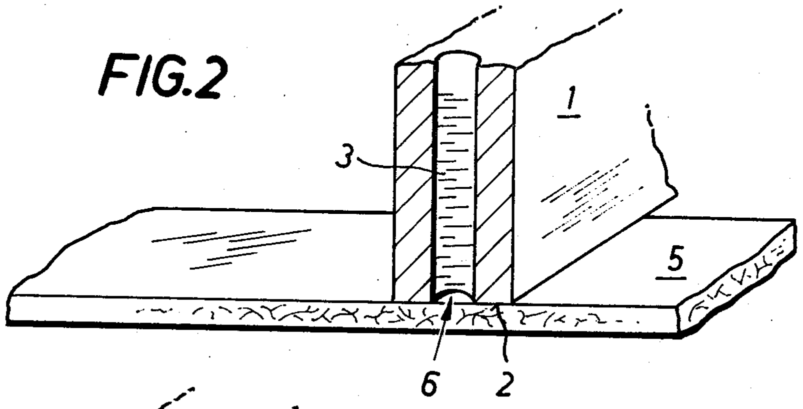
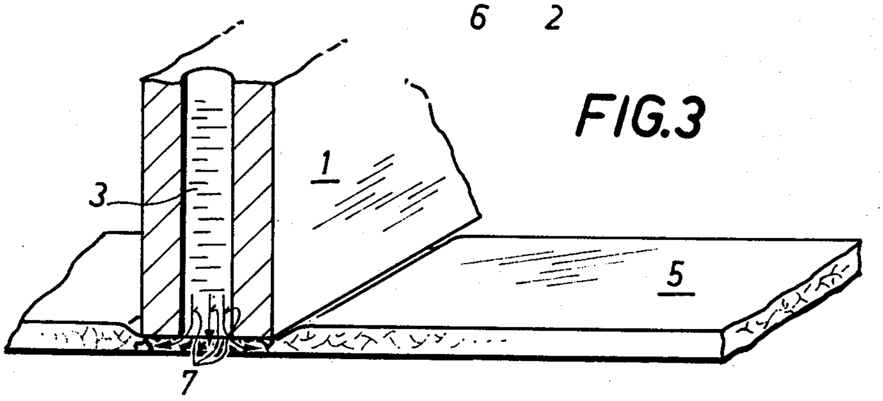
FIG.3

MAINTAINING THE NOZZLE SURFACE OF AN INK WRITING HEAD

BACKGROUND OF THE INVENTION

The present invention relates to cleaning of the nozzle surface of an ink writing head in an ink printer, the writing head being of a type provided with nozzles and with variable volume chambers in flow connection with the nozzles for discharging ink in droplet form, and to the use of a particular cleaning medium for that purpose.

Ink writing heads, mosaic writing heads and similar devices for transferring droplets of ink onto a print carrier are disclosed, for example, in German Offenlegungsschrift [Laid-open Application] No. 2,132,082 and counterpart U.S. Pat. No. 3,946,398, German Auslegeschrift [Published Application] No. 2,164,614, U.S. Pat. No. 3,747,120 and German Offenlegungsschrift No. 2,543,451. These writing heads are provided with chambers whose volume can temporarily be changed and which are each in flow connection with a nozzle to which a pulse for discharging a drop of ink is transmitted when the chamber volume is reduced.

According to observations made in the art, the exit area of the nozzle or the nozzle surface, respectively, attracts impurities from the ambient air which remain attached thereto and lead to malfunctions in the dynamic behavior of the ink during the emission of droplets. Ink that has thickened in the nozzle area also leads to changes in the droplet break-off behavior, causing droplets to be deflected and thus transmitted inaccurately to the print carrier. The volume of individual droplets vary and generally becomes less than the volume of a properly transferred droplet. Moreover, such impurities may cause one or a plurality of air bubbles to be captured when the ink meniscus retreats into the nozzle, which can lead to the non-functioning of one or a plurality of nozzles for an extended period of time. The soiling of the nozzle surface may occur when the nozzle is in its operative or its inoperative state.

German Auslegeschrift No. 2,362,576 discloses a device for preventing the discharge of ink from the nozzles of a writing head by means of a cap of a closed, fine-celled and rubber elastic foamed substance which contacts the nozzle surface. By closing the nozzles, it becomes possible to prevent infiltration and trapping of air, discharge of ink from the nozzles, soiling of the nozzles and formation of dried ink in the nozzles during periods when the writing head is not in use. The honeycomb structure of the foamed material is intended to produce a suction effect when the cap is lifted off the nozzle thus carrying along dirt particles that might adhere to the nozzle surface. It has been found, however, that after repeated and extended covering periods, the foamed material loses its elasticity. To produce a seal on the nozzle surface on all sides, the foamed material must be highly deformed by means of a given force when it is applied to the nozzle. Uniform wetting of the nozzle region and of the adjacent nozzle surfaces cannot be attained.

German Auslegeschrift No. 2,317,911 discloses the sucking away of a neutral fluid and once it has been exchanged, also a writing fluid expelled from the nozzles of an ink writing head, by means of a piece of leather. The leather, as long as it is dry, has a contact angle which is greater than 90°. The contact angle can also be reduced by prior moistening and wringing out.

A leather sheet can be used in an ink writing mechanism only within limits and only if it is in continuous flow connection with a fluid reservoir.

It has, moreover, been found that, for maintaining the operational efficiency of ink writing heads such as those described, for example in German Auslegeschrift No. 2,164,614, and in U.S. Pat. No. 3,747,120, a distinction must be made between the functions of sealing the nozzle surface from the atmosphere by placing a suitable sealing material against it and cleaning impurities from the nozzle surface by means of a medium suitable for this purpose.

In order to maintain the operational efficiency of an ink writing head over long periods of inactivity, and to prevent the discharge of ink from the nozzles and the entrance of air into the nozzles, drying or thickening of ink in the outer nozzle region, deposits of minute particles from the ambient air, etc. has been found to be necessary to seal the nozzle surface.

On the other hand, as noted above, impurities are deposited on the nozzle surface during the writing process. These impurities must be removed by cleaning the nozzle surface from time to time, preferably while the ink writing head is in a nonprinting area.

German Patent Application No. P 27 05 328.7 discloses a device for covering the nozzle surface of an ink writing head in an ink printer by means of a covering tape of silicone rubber which is driven via guide rollers. When this tape contacts the nozzle surface at the ink writing head, the nozzle surface and the nozzles are closed and sealed under utilization of a viscous, elastic flow. Surface adhesion to the covering tape causes particles to be carried along when the covering tape is removed from the nozzle surface. Likewise, wet particles can be removed from the nozzle region and lifted off the covering tape by means of a scraping device.

SUMMARY OF THE INVENTION

It is an object of the present invention to clean the nozzle surface of an ink writing head by conveying ink out of the nozzles into the cleaning medium when the latter is placed against the nozzle surface.

A specific object of the invention is to provide suitable cleaning media for producing a flow of ink of a defined quantity.

Further objects of the present invention are to separate the functions of sealing and cleaning, to clean a sealing tape with the already provided cleaning tape and to remove the dirt particles lifted off the nozzle surface by the sealing tape and by the cleaning tape from the region of the nozzle openings as a result of contact of the ink writing head on the tapes.

These and other objects according to the invention are achieved by a method for cleaning the nozzle surface of an ink writing head installed in an ink printer, which ink writing head is provided with a plurality of nozzles each nozzle having its outlet opening located at the nozzle surface, and variable volume chambers in flow connection with the nozzles for discharging ink in droplet form, which method includes bringing a liquid-absorbing cleaning medium into contact with at least those portions of the nozzle surface which surround the nozzle outlet openings; maintaining such contact for a period to permit ink to flow from the nozzles in the direction toward the cleaning medium and to be absorbed by the cleaning medium, whereby the nozzle surface is wetted by a liquid phase in which particles to be removed are dissolved; and removing the cleaning medium from the nozzle surface in order to carry such particles away from the nozzle surface.

The objects according to the invention are achieved by a method for cleaning the nozzle surface of an ink writing head, which surface defines the outlet ends of a plurality of ink discharge nozzles, which involves bringing the nozzle surface into contact with an absorbing medium exhibiting capillarity and possessing capillary passages smaller in diameter than the nozzles and presenting a contact angle of less than 90° with the ink.

The above-described methods according to the invention exclude wiping movements on the nozzle surface. Cleaning is effected by a flow of ink from the nozzles into the cleaning medium. Moreover, it has been surprisingly found that air bubbles embedded in the nozzles can be sucked away.

The cleaning medium may be present in strip form and may thus remove dirt particles out of the cleaning region by a winding process. The contact pressure to be applied may be kept small. Deformation of the cleaning medium during contact with the nozzle surface is thus only slight. However, in an advantageous and surprising manner, it leads to an increase in the capillarity of the cleaning medium in the region of the contacting nozzle surface.

Objects of the present invention are further achieved, in apparatus for protecting the nozzle surface of an ink writing head in an ink printer, which apparatus sealing means having an endless sealing surface and arranged to contact the nozzle surface, and a cleaning device for removing impurities from the sealing surface of the sealing means, by forming the cleaning device of a tape constituting a cleaning medium, and a plurality of reels on which the tape is wound and between which the tape extends in a manner to permit one of its surfaces to be brought into contact with the nozzle surface and to permit the other surface of the tape to be brought into contact with the sealing surface after removal of the sealing surface from the nozzle surface.

According to a particular embodiment of the invention, the sealing means is in the form of a sealing tape, the apparatus further includes roller means supporting the sealing tape, the cleaning medium tape is wound on the reels in a replaceable manner and the sealing tape is supported by the roller means in a replaceable manner.

According to an advantageous embodiment of the invention, there is provided a cassette in which the roller means, the reels and the tapes are disposed and the cassette is removably fastened to a cassette drive of the printer. Since the cassette is replaced as a unit, replacement of both tapes automatically occurs at identical intervals.

A structurally simple and compact unit can be formed according to the invention by providing the sealing means in the form of a roller whose outer cylindrical surface constitutes the sealing surface, and by providing the cleaning device with deflecting means forming the tape into a loop in the region of the roller and placing a portion of the loop against said sealing surface. The tapes of such a unit can be driven and guided by relatively inexpensive components and mechanisms.

BRIEF DESCRIPTION OF THE DRAWINGS

FIG. 1 is a perspective view of the nozzle surface of an ink writing head in an ink printer.

FIG. 2 is a cross-sectional perspective view of a first cleaning medium according to the invention placed against the surface of a nozzle.

FIG. 3 is a view similar to that of FIG. 2 showing the flow of ink into the cleaning medium of FIG. 2.

DESCRIPTION OF THE PREFERRED EMBODIMENTS

Figure 4:
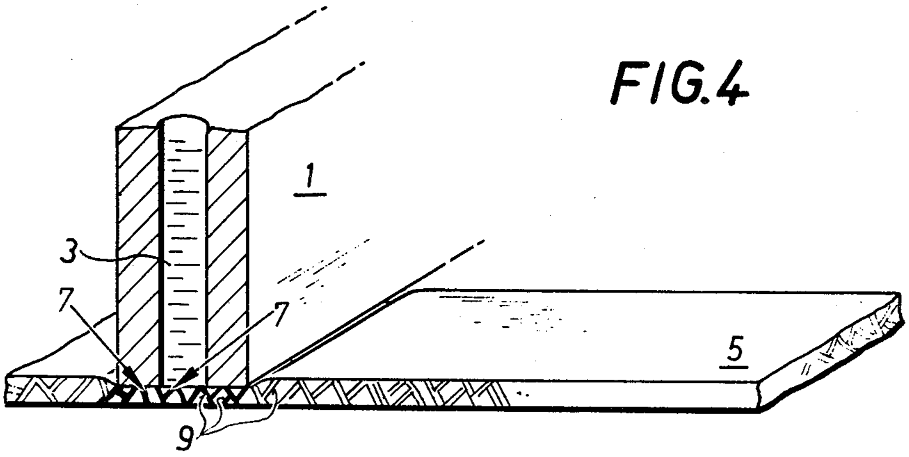
FIG. 4 is a view similar to that of FIG. 3 showing the flow of ink into a further embodiment of a cleaning medium placed against the nozzle surface.

The present invention is based on the recognition resulting from observation of many experimental structures, that the cleaning medium will carry along impurities from the nozzle surface only if the rate of flow of ink from the nozzle or nozzles, respectively, into the cleaning medium does not exceed certain values, since too rapid saturation of the cleaning medium leads to accumulation of ink during removal from the nozzle surface. Carrying along of impurities then becomes impossible. Likewise, if a minimum flow speed is not achieved, impurities are not lifted away from the nozzle surface nor carried along by the cleaning medium. The maximum and minimum flow speeds are not easily determinable numerically and additional experiments were required for that reason. Impurities on the nozzle surface are constituted by dried or thickened ink, which can be dissolved by wetting, as well as by dust out of the surrounding air, and hairs, skin particles, lint and the like, which when deposited in the nozzle region are encased in a film of ink.

In order to maintain the flow speeds further essential factors and parameters must be observed in the selection of suitable cleaning media. Thus the cleaning medium itself must not be separated particles which interfere with the flow of the ink, and/or which could be deposited at the nozzle surface. Determinative for the selection of suitable cleaning media are thus the surface tension of the ink and of the cleaning medium as well as the resulting interfacial surface tension and the contact angle of the ink on the cleaning medium as well as on its capillaries. Furthermore, contact pressure, temperature and humidity must be considered in locating suitable materials.

A low surface tension as a characteristic of the ink, a low contact angle, less than 90°, between the ink and the cleaning medium and capillaries of the cleaning medium, which are smaller than the capillaries of the nozzles, are necessary prerequisites for the ink to be able to penetrate into the cleaning medium sufficiently rapidly. Too high a contact pressure requires larger pressing and guide elements for the writing head. The advantage is here that the ink will first be held in the region of greater capillary force, i.e. in the region which is being compressed due to contact of the cleaning medium with the ink writing head. Propagation in the transverse direction is slight and the required length for cleaning media in the form of strips is short and can be kept approximately equivalent to the width of the ink writing head.

FIG. 1 shows an ink writing head 1 movable in the row, or horizontal, direction of an ink printer. The writing head 1 has a nozzle surface 2 constituting the exit plane for nozzles 3 from which ink is discharged in the form of droplets. Impurities 4 are formed by deposition of dirt particles on the nozzle surface during operation as well as during the periods between operations, from the ambient air, and by drying or thickening of residual quantities of ink. During the discharge of droplets, elongate hair-like dirt particles are encased in ink and interfere with the breaking off of the ink as do the retained residual ink quantities. The head 1 is arranged to print on a record carrier 8 shown in dot-dash lines.

As shown in FIG. 2, cleaning of the nozzle surface 2 is effected by a strip of a cleaning medium 5 which is placed against the nozzle surface 2 of the ink writing head 1 without pressure and without effecting any wiping action. The ink meniscus 6 in the nozzle 3 disappears when, as shown in FIG. 3, the cleaning medium 5 is pressed lightly against the nozzle surface at a pressure force about 2 Newtons.

Figure 5:
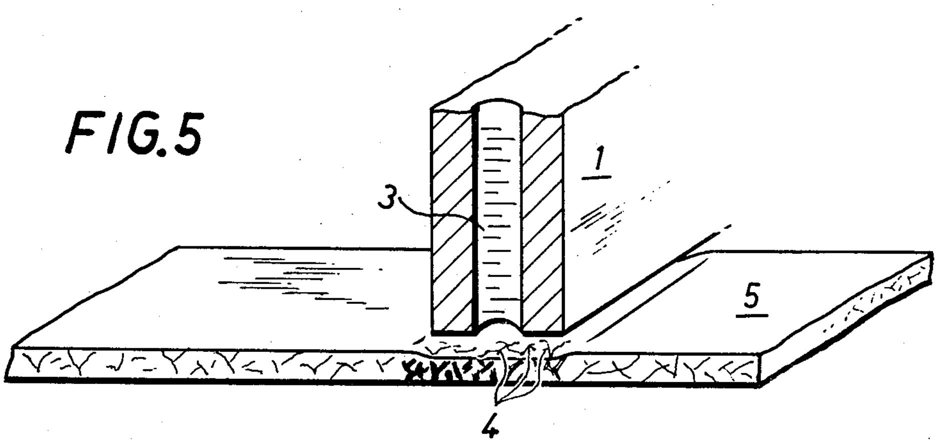
FIG. 5 is a view similar to that of FIG. 4 showing the flow of ink in the break-off phase.

The impurities 4 illustrated in FIG. 1 are disposed between the nozzle surface 2 and the cleaning medium 5. Ink is now conveyed in the direction of the cleaning medium due to higher capillary forces in the cleaning medium, with simultaneous sucking away of the air disposed between the ink meniscus and the surface of the cleaning medium. The flow of ink, on the one hand, carries away gas bubbles that exist in the nozzle and, on the other hand, through the capillaries in the cleaning medium wets the nozzle surface 2 as shown by the arrows 7. The capability of the cleaning medium to absorb ink remains in effect for a time after it has been removed from the nozzle surface. Due to the tendency of the ink to undergo further flow after the cleaning material has been removed from the nozzle surface, the impurities 4 are transferred to the cleaning medium 5, as shown in FIG. 5. The travel of the impurities is a result of the conveyance of ink due to capillary forces in the contact region.

The duration of contact of the cleaning medium with the nozzle surface depends on the type of soiling of the nozzle surface. For example, removal of ink residues must be effected with the aid of a wetting phase. Thus the cleaning medium must contact the nozzle surface for a correspondingly longer period of time.

Figure 6:
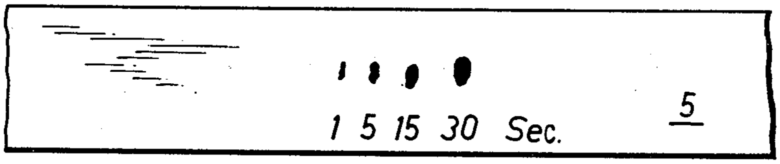
FIG. 6 is a side view illustrating the cleaning behavior of one cleaning medium. as a function of the cleaning time in form of a flat tape.
Figure 7:
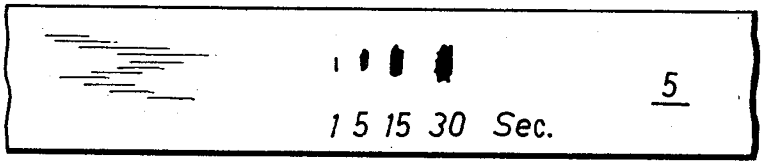
FIG. 7 is a view similar to that of FIG. 6 relating to a further cleaning medium.

FIGS. 6 and 7 are views of regions on the cleaning medium which have already been used to clean the nozzle surface and which have been blackened by the absorption of ink in the regions of the contact faces.

FIG. 6 shows the medium of FIGS. 2, 3 and 5, while FIG. 7 shows the medium of FIG. 4. The cleaning media were removed from the nozzle surface after 1, 5, 15 and 30 seconds, respectively, as marked. The duration of contact with the nozzle surface is characterized more by the width than by the height of the blackened portions. The illustrated blackenings in FIGS. 6 and 7 are given at normal size.

For the embodiment shown in FIGS. 2, 3, 5 and 6, a cleaning medium was used which consisted of an unglued, satinized intaglio paper. FIGS. 4 and 7 show the use of a diaphragm filter, for example a filter of a polyamide or of nitrocellulose or acetate cellulose. The selected capillary size of these filter papers in both cases was 1.2$\mu$.

Diaphragm filters with other capillary diameters behaved similarly. When a diaphragm filter is used, the ink is absorbed into a depth of the cleaning medium which is determined by the size of the capillaries 9, as shown in FIG. 4.

Said cleaning mediums are in normal commercial usage, the paper for printing and the filter material for labor use. The preferred time for the contact between the cleaning mediums and the nozzle surface is between five and thirty seconds and is dependent on the purpose. The contact force is about 2 Newtons.

The cleaning tape 5 can be pressed against the nozzle surface by any suitable means. Arrangements for effecting contact between the cleaning tape and the nozzle surface will be described below with reference to FIGS. 8 and 9.

Figure 8:
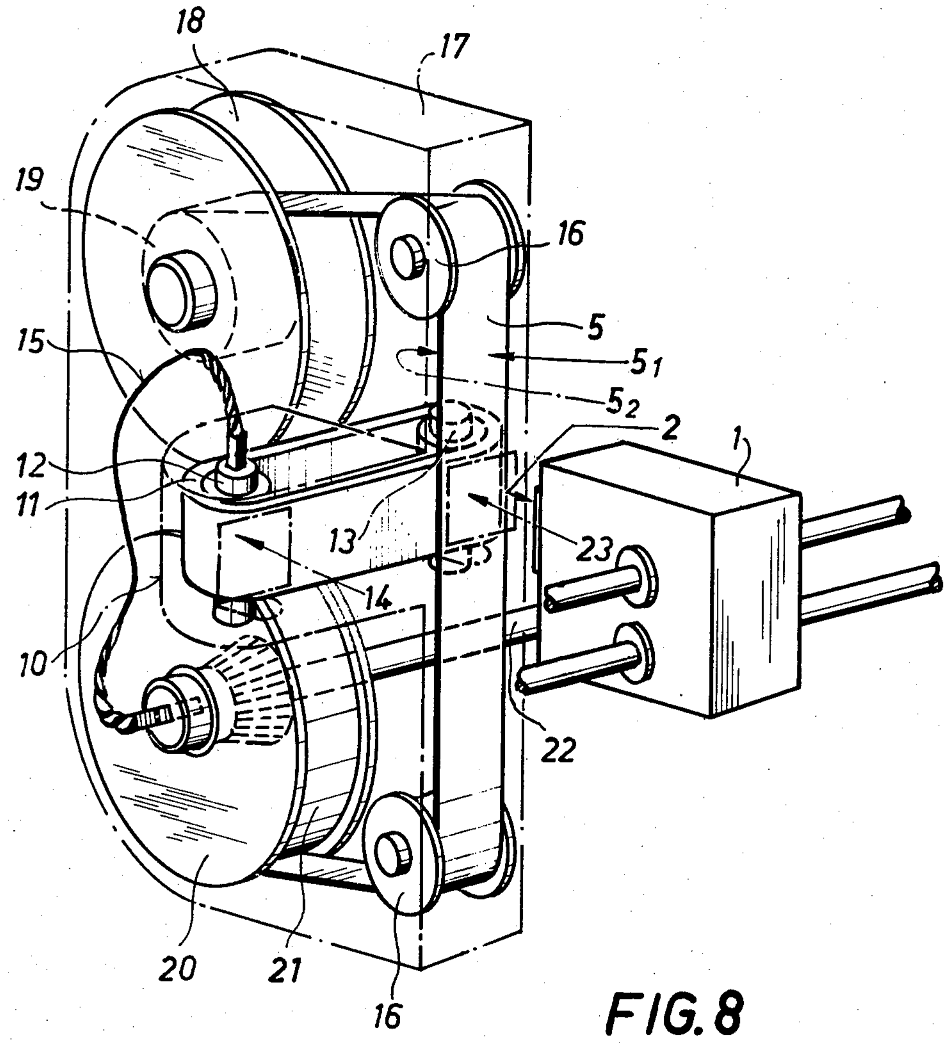
FIG. 8 is a perspective view of a cassette according to the invention inserted into an ink printer and containing a sealing tape and a cleaning tape.

FIG. 8 shows an ink writing head 1 in an ink printer which is movable in the direction of a row of characters and is mounted on guide and drive rails in a conventional manner. Head 1 is illustrated as being at one end of its travel path, where its nozzle surface 2, which constitutes the discharge plane for nozzles emitting droplets, is to be cleaned. Components of the ink printer which are not significant for the present invention are not shown.

At the end position of the ink writing head, a cassette 17 is disposed and is connected, via coupling elements (not shown) with the spindle, or shaft, 22 of a rotary drive for the cassette reel 20. It is conceivable, however, for the tape winding, deflecting and drive means to be described below to be permanently installed in the ink printer, a cleaning tape 5 and a sealing tape 11 being replaceable after removal of a cover over the entire arrangement (not shown).

A supply reel 18 and a take-up reel 20 are rotatably mounted in the cassette 17, the reel 20 being coupled to the spindle 22. The supply reel 18 is provided with a winding core carrying a coil 19 of the cleaning tape 5. The take-up reel 20 carries a coil 21 of the tape 5 which has already passed the cleaning station, defined by an opening 23, and has been used. The nozzle surface can pass through the cassette wall, or the cleaning tape can protrude from the cassette, via opening 23. The cleaning tape 5 is guided past this opening by passing around deflecting rollers 16.

Two guide rollers 12 and 13 are mounted in the cassette with their axes of rotation transverse to the axes of rotation of the supply and take-up reels 18 and 20 and carry a sealing tape 11 which extends across reels 18 and 20. The cassette 17 is provided with a transversely protruding structure 10 for accommodating the roller 12 and part of the sealing tape 11. A further window 14 is provided in the wall of the protruding structure 10 via which contact can be established between the sealing tape and the nozzle surface of the ink writing head. The rollers 12 and 13 may both be disposed on a carrier (not shown) so as to be movable in the direction of the openings 23 and 14, for example under the influence of spring elements, to establish contact between the cleaning tape 5 or the sealing tape 11 and the nozzle surface 2 of the ink writing head 1. For this purpose, the sealing tape 11 is disposed, in the region of its guide roller 13, behind the cleaning tape 5 so that the outer surface of tape 11 can rest, in that region, against the inside surface $5_2$ of the cleaning tape. In the region of window 14, the outer surface of tape 11 can be placed against nozzle surface 2.

The roller 12 is a driven roller and is connected, via a torsion transmitting element 15 or any other conceivable means, with the reel 20 or the spindle 22 so that the sealing tape can be moved at the same time as the cleaning tape. Roller 12 could, alternatively, be driven separately from tape 5.

Sliding movement of the outer surface of sealing tape 11 against the inside surface $5_2$ of the cleaning tape continuously removes particles and moisture from the former after their prior removal from the nozzle surface via opening 14. Movement of the cleaning tape 5 transports these particles, as well as particles removed from the nozzle surface by contact of the front surface $5_1$ of the cleaning tape with the nozzle surface, from the region of the opening 23, and thus from the region of the nozzle surface 2, to the lower portion of the cassette, or to the reel 20.

The cleaning tape 5 employed is made of an absorbent medium having capillaries of a smaller diameter than the capillaries defining the nozzles and is selected to have a contact angle of less than 90° (wetting), e.g. a diaphragm filter, so that it is assured that foreign particles and impurities, of any type are removed from the nozzle surface.

The sealing tape 11 used for sealing purposes may be a suitable carrier foil that has been coated with silicone rubber to a suitable thickness. Bringing this tape perpendicular into contact with the nozzle surface of the ink writing head causes the latter to be completely sealed from the atmosphere in that even the smallest cavities are filled by the viscous, elastic flow behavior of the silicone rubber. After removal of the sealing tape from the nozzle surface, minute particles from the air and moist regions sometimes appear on the sealing tape surface, and these are subsequently received by the side $5_2$ of the cleaning tape 5 facing away from the nozzle surface 2. The silicon coated foil of the tape 11 consists of a polyester. The silicon rubber coating has a thickness about 0.1 millimeter. The force with which it is applied to the nozzle surface is about 2 Newtons.

The guide rollers 12 and 13 for the sealing tape are rotatably mounted inside the cassette 17 or its extension 10, respectively, behind openings 14 and 23, respectively, and serve as backing elements, or supports, for contact of the tapes with the nozzle surface of the ink writing head.

Figure 9:
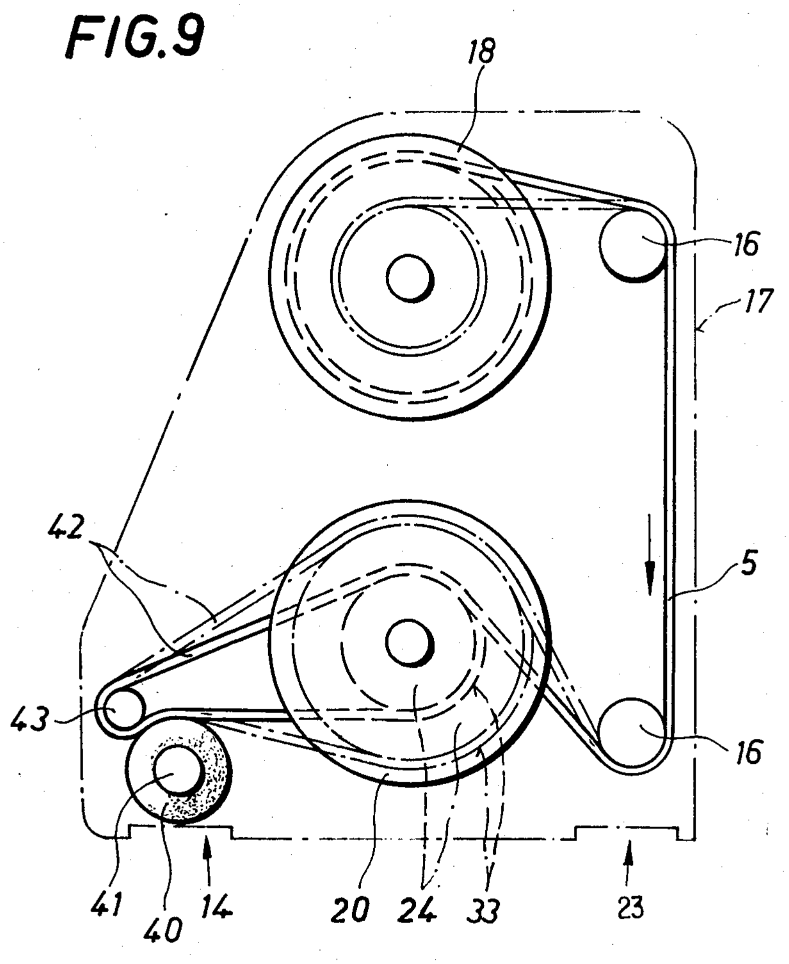
FIG. 9 is a side view of an embodiment of a cassette according to the invention including a cleaning tape and a sealing roller.

The cassette 17 shown in FIG. 9 also includes a supply reel 18, a take-up reel 20 and deflecting rollers 16 for the cleaning tape 5. Before being wound onto a core 24 of take-up reel 20, cleaning tape 5 passes around the core, forms a loop 42 around a loop roller 43, and then forms the outer turn 33 of the tape wound around core 24. The sealing tape is replaced by a sealing roller 40 which again may be made of a silicone rubber and which is rotatably mounted on a roller shaft 41 in the region of the opening 14. The outer surface of roller 40 engages part of loop 42, and thus that surface of tape 5 which would not have contacted the nozzle surface. As a result of this contact of the previously unused surface of the cleaning tape 5 with the sealing roller 40, the latter is freed of dirt particles and moisture which are then likewise wound onto the tape reel 24.

FIG. 9 shows the configuration of cleaning tape 5 at the start of use of a new tape, when most of the tape is on reel 18, in solid and broken lines, and near the end of use of a tape, when most of the tape is on reel 20, in dot-dash lines. In both end configurations, and in every configuration therebetween, roller 40 remains in firm contact with loop 42 adjacent roller 43. The movements of the rollers 12, 13, 16 and 40 are perpendicular forward and backwards to the nozzle surface 2. A spring device (not shown) produces the pressure force for the cleaning and the sealing mediums to the nozzle surface. After each contact between the cleaning mediums and nozzle surface there is a transport of the cleaning medium by the shaft 22 and at the same time a transport of the sealing medium. After disconnection of the cleaning medium, tape 5, or the sealing medium tape 11 or roller 40 from the nozzle surface 2 this medium may be advanced. The transport of both tapes or the tape and the roller can be achieved by coupling them together by contact to each other or through a gearing. The roller 40 in FIG. 9 is made of silicon rubber of the Dow Corning Company and has a diameter of eighteen millimeters and a hardness of forty shore A. The contact pressure between the nozzle surface 2 and the sealing medium, roller 40 or tape 11, and the cleaning medium 5 is about 2 Newtons. It may be that the roller 40 is rotated by contact with the loop 42 by friction or by a linkage such as 15 in FIG. 8 between shaft 41 and the shaft of the reel 20.

It will be understood that the above description of the present invention is susceptible to various modifications, changes and adaptations, and the same are intended to be comprehended within the meaning and range of equivalents of the appended claims.

What is claimed is:

1. A method for cleaning the nozzle surface of an ink writing head installed in an ink printer, which ink writing head is provided with a plurality of nozzles each nozzle having its outlet opening located at the nozzle surface, and variable volume chambers in flow connection with the nozzles for discharging ink in droplet form, comprising: bringing a liquid-absorbing cleaning medium into contact with at least those portions of the nozzle surface which surround the nozzle outlet openings for establishing a flow of ink from the nozzles into the medium; maintaining such contact for a period to permit ink to flow from the nozzles in the direction toward the cleaning medium and to be absorbed by the cleaning medium, whereby such nozzle surface portions are wetted by a liquid phase in which particles to be removed are dissolved; and removing the cleaning medium from the nozzle surface at a time at which the cleaning medium which was in contact with the nozzle surface continues to exhibit a liquid absorbing capability in order to carry such particles away from the nozzle surface.

2. A method for cleaning the nozzle surface of an ink writing head, which surface defines the outlet ends of a plurality of ink discharge nozzles, comprising bringing the nozzle surface into contact with an absorbing medium exhibiting capillarity and possessing capillary passages smaller in diameter than the nozzles and presenting a contact angle of less than 90° with the ink so that ink flows from the nozzles into the medium, and separating the medium from the nozzle surface at a time when the medium is continuing to absorb ink from the nozzles.

3. A method as defined in claim 2 wherein the absorbing medium is an unglued, satinized intaglio paper.

4. A method as defined in claim 2 wherein the absorbing medium is a filter material.

5. A method as defined in claim 4 wherein the filter material contains long fibers resistant to breakage when wet.

6. A method as defined in claim 2 wherein the absorbing medium is a diaphragm filter having a capillary diameter of less than 10μ.

7. A method as defined in claim 2 wherein the absorbing medium is a polyamide diaphragm filter.

8. A method as defined in claim 2 wherein the absorbing medium is a nitrocellulose diaphragm filter.

9. An apparatus for protecting the nozzle surface of an ink writing head in an ink printer, and including sealing means having an endless sealing surface and arranged to contact the nozzle surface, and a cleaning device for removing impurities from the sealing surface of the sealing means, the improvement wherein said cleaning device comprises a tape constituting a cleaning medium, and a plurality of reels on which said tape is wound and between which said tape extends in a manner to permit one of its surfaces to be brought into contact with the nozzle surface and to permit the other surface of said tape to be brought into contact with said sealing surface after removal of said sealing surface from the nozzle surface.

10. An arrangement as defined in claim 9 wherein said sealing means is in the form of a sealing tape, and further comprising roller means supporting said sealing tape, and wherein said cleaning medium tape is wound on said reels in a replaceable manner and said sealing tape is supported by said roller means in a replaceable manner.

11. An arrangement as defined in claim 10 further comprising a cassette in which said roller means, said reels and said tapes are disposed and said cassette is removably fastened to a cassette drive of the printer.

12. An arrangement as defined in claim 9 wherein said sealing means comprise a roller whose outer cylindrical surface constitutes said sealing surface.

13. An arrangement as defined in claim 12 wherein said cleaning device further comprises deflecting means forming said tape into a loop in the region of said roller and placing a portion of said loop against said sealing surface.

* * * * *